Figure 1:
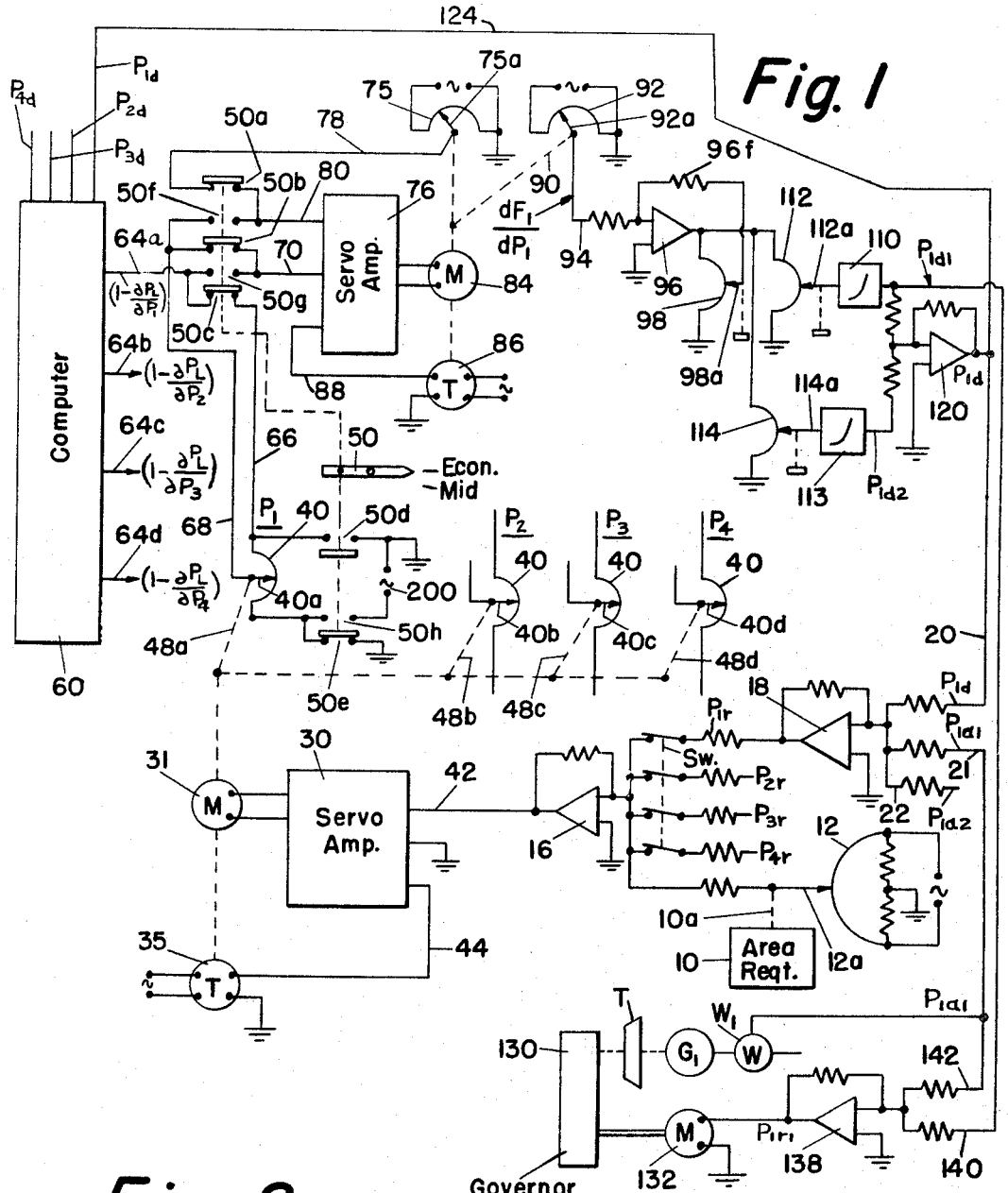

July 9, 1968 W. O. STADLIN 3,392,272
MINIMUM INPUT DISPATCH COMPUTER
Filed June 3, 1963

United States Patent Office 3,392,272
Patented July 9, 1968

3,392,272
MINIMUM INPUT DISPATCH COMPUTER
Walter O. Stadlin, Eagleville, Pa., assignor to Leeds & Northrup Company, a corporation of Pennsylvania
Filed June 3, 1963, Ser. No. 285,006
8 Claims. (Cl. 235—151.21)

This disclosure relates to the calculation of the optimum load distribution among a plurality of interconnected generating sources, more specifically to an arrangement for so calculating and controlling the load distribution as to provide a minimum total transmission loss while meeting the load requirements of the area.

In the past, load distribution calculations utilized to maintain maximum economy have been based on the maintenance of equal incremental costs of delivered power and pursuant to the well known economic dispatch equation:

$$\lambda = \frac{\frac{dF_m}{dP_m}}{1 - \frac{\partial P_L}{\partial P_m}} \quad (A)$$

where
$\lambda$ = incremental cost of delivered power,
$F$ = total system fuel cost in dollars per hour,
$dF_m/dP_m$ = incremental cost of generation for station "$m$,"
$\partial P_L/\partial P_m$ = incremental transmission losses for station "$m$,"
where
$P_L$ = total transmission losses in megawatts, and
$P_m$ = total generation of station "$m$" in megawatts.

It has been mathematically shown that systems which maintain equal the incremental cost of delivered power from all stations are operating at maximum economy. While systems of the foregoing character are in wide use, they nevertheless leave something to be desired for those conditions of operation where the system load plus the spinning reserve exceed the conditions where equal-$\lambda$ operation may be realized. It is common practice in such cases to arrange for the flow of power to an area over a tieline from an adjoining area when the load is such that that area is no longer capable of supplying its own load equal-$\lambda$ operation. In a number of instances, it has been found that it is more economical to depart from the equal-$\lambda$ mode of operation than it is to purchase power by way of a tieline from an adjacent area.

In accordance with the present invention, the generation within an area is so controlled as to maintain equal incremental transmission losses associated with the several sources or generating stations comprising an area rather than controlled to maintain equal incremental costs of delivered power. If there be maintained for each generating station or source equal incremental transmission losses, the total transmission losses for the system as a whole will be a minimum, and hence there will be achieved the minimum input required to meet the existing load conditions.

In carrying out the invention, there is provided a means for producing an input signal representative of equal incremental transmission losses associated with each of a plurality of generation sources. A computing means is provided to produce in response to the input signal a plurality of output signals, each representing the generation required of a separate one of said sources to provide operation at the incremental transmission loss represented by said input signal. In addition, means are provided for changing the input signal in direction and to the extent necessary to tend to maintain the sum of the values of required generation as represented by the output signals at equality with the desired total generation for the system.

Figure 2:
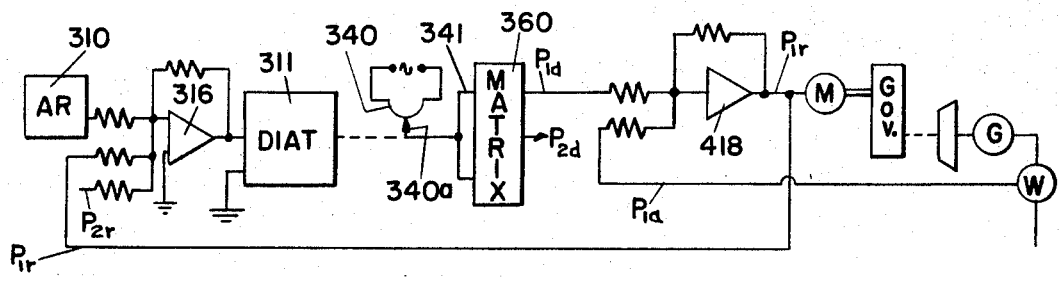

For further objects and advantages of the invention, reference is to be had to the following detailed description taken in conjunction with the accompanying drawing, in which:

FIG. 1 diagrammatically illustrates a preferred embodiment of the invention; and FIG. 2 diagrammatically illustrates a further embodiment of the invention.

Referring to FIG. 1, there has been illustrated schematically, but in detail, the control features for a power generating source $G_1$, the output of which is measured by a wattmeter $W_1$. The generator $G_1$ may represent a single source at a station. However, the station will frequently have more than one generator, and for purposes of illustration station $P_1$ will be considered as having two generators, units 1 and 2. Hence, though only one generator has been illustrated for station $P_1$ with wattmeter $W_1$ measuring its output and applying it by conductor 21 to the input of a summing or operational amplifier 18 and labeled $P_{1a1}$, a second input by way of conductor 22 has also been illustrated and labeled $P_{1a2}$ to represent the actual generation of unit 2. Thus the actual generation for station $P_1$ consists of the sum of the actual generations $P_{1a1}$ and $P_{1a2}$. There is also provided an input to the operational amplifier 18 by way of conductor 20 labeled $P_{1d}$ and representative of the desired generation for station $P_1$. If the actual generation differs from the desired generation, there will be an output, required generation change $P_{1r}$, from the amplifier 18, and this in turn will be applied to an input of a second operational amplifier 16. The three additional inputs $P_{2r}$, $P_{3r}$ and $P_{4r}$ symbolically represent three additional stations comprising the area ultized for an explanation of the invention. Thus the amplifier 16 compares the sum of the required changes in generation for the four stations with area requirement, area requirement being represented by a signal derived from a slidewire 12 forming part of a potentiometer and by way of adjustable contact 12a.

For the purposes of the present description, a potentiometer is defined to include a source of potential and, in general, includes a slidewire with an adjustable contact. The slidewire 12 has associated with it the described source of supply and two equal-valued resistors with their junction point grounded in order that movement of the contact 12a in one direction or the other from its midpoint will reverse the instantaneous polarity of the output and thus provide a signal indicative of the direction and extent of movement from its neutral position.

The contact 12a is operated by the output of an area requirement control network 10 of the type described in Carolus Patent 2,688,728 and also shown in FIG. 9 of Cohn Patent 2,773,994. The mechanical connection 10a corresponds with the mechanical output of the rebalancing mechanism 229 of said Cohn patent or the output of the mechanism 29 of said Carolus patent. Those skilled in the art understand that area requirement systems provide outputs proportional to the total required changes in generation for all of the stations to meet the existing load requirements. Such an output may include modifying functions, such as frequency bias, time-error corrections, and the like. From the foregoing, it will be seen that if the computed area requirement as represented by the signal derived from contact 12a is equal and opposite to the sum of the required changes is generation, there will be absent any output from the operational amplifier 16. Normally, such will not be the case, however, and there will be produced in the output of amplifier 16 a signal representative of the difference between area requirement and the sum of the previously computed required changes in generation for all stations.

The present invention is primarily directed to the operation which produces for the several generating stations a control of generation for equal incremental transmission losses: this novel mode of operation is for brevity herein termed "minimum input dispatch." However, that form of the invention exemplified by FIG. 1 also includes provision for changeover to "economic dispatch operation," i.e., control of the generation from the several stations to provide equal incremental costs of delivered power from the several stations. For contrasting these old and new types of operation, there will first be described the operation of the system of FIG. 1 to provide equal incremental cost of delivered power from the several stations, and there will then be set forth the manner in which there is achieved operation with equal incremental transmission losses from all stations.

Remembering that the output of the amplifier 16 provides a signal representative of the difference between area requirement and the sum of the required changes in generation previously computed for the several stations, it will be seen that the application of this signal by way of conductor 42 to a servoamplifier 30 will produce rotation of a balancing motor 31. This motor drives a tachometer 35 having its output connected by way of conductor 44 to provide negative feedback for the servoamplifier 30. As long as there is an input signal to the servoamplifier by way of conductor 42, there will be rotation of the motor 31, but its maximum speed or rate of movement will be limited by the feedback signal from tachometer 35. The extent of movement, i.e., rotation of motor 31 will be proportional to the time integral of the error signal of conductor 42. This error signal is representative of the difference betwen the measured or actual generation of the several stations and the computed desired generation. The manner in which the last-named computation is made will hereinafter be explained.

The motor 31 concurrently adjusts contacts 40a–40d of their respective slidewires 40 by way of mechnical connections 48a–48d. With the parts in the illustrated positions, the slidewires 40 are connected to output terminals of an incremental transmission loss computer 60. Thus the output conductor 64a from the computer 60 extends to slidewire 40 by way of contacts 50c of a transfer switch 50, conductor 66, slidewire 40 and thence by way of contacts 50e to ground.

The transfer switch 50 is illustrated in its "Econ." position, meaning the position for economic dispatch operation. Accordingly, contacts 50a and 50b, 50c and 50e are closed, while contacts 50f, 50g and 50d and 50h are open. It is understood that there will be a like set of contacts for each station and that there will be duplication of the parts now to be described in connection with station $P_1$ for each of the remaining stations. For example, through the contacts of transfer switch 50, there will be established a connection of the slidewire 40 for station $P_2$ to the output conductor 64b of computer 60, and similar connections for the remaining slidewires 40 for stations $P_3$ and $P_4$ to the respective output conductors 64c and 64d. Similarly, for each station there will be a connection corresponding with the connection from slidewire contact 40a by way of contacts 50b to an input conductor 70 of a servoamplifier 76 for controlling the operation of a balancing motor 84. This servoamplifier also includes a negative feedback connection by way of conductor 88 to a tachometer 86 for limiting the maximum speed or rate of movement of balancing motor 84. Preferably, the maximum speed of motor 84 is in excess of that of motor 31.

Through the contacts 50a there is completed a connection to the input circuit 80 of servoamplifier 76 by way of conductor 78 to a balancing slidewire or potentiometer 75, the movable contact 75a of which is driven by the motor 84 in a direction to reduce to zero the input to the servoamplifier.

In order to compute the desired generation for each station, there is provided the incremental transmission loss computer 60 which may be of any suitable type, either one adapted to digital operation or of the matrix or analog type, such as that disclosed in Patent 2,836,730 issued to E. D. Early on May 27, 1958, and specifically illustrated as the matrix 25 in FIG. 2 of that patent along with the several transformers $T_4$–$T_6$. This incremental transmission loss computer 60 receives input signals representative of the computed desired generation values, namely $P_{1d}$–$P_{4d}$, representing each of the four interconnected stations in the area. In response to these inputs, the computer produces outputs representative of the quantity unity minus the incremental transmission losses and frequently referred to as an incremental quantity representing the percentage of power delivered by each of the stations. As noted above, this quantity is usually represented mathematically by $$\left(1 - \frac{\partial P_\mathrm{L}}{\partial P_\mathrm{m}}\right)$$

Thus, there is provided for the computations with regard to station $P_1$ a signal at line 64a which is representative of that quantity, where $P_\mathrm{m}$ is the generation of station $P_1$. As has been well explained in the above-mentioned Early patent and by inspection of the economic dispatch equation given above, this quantity when multiplied by a value established for lambda provides a value for the incremental cost of power for rotation $P_1$ at which that station must be operated for the particular value of lambda. This multiplication is carried out by the connection of line 64a through the contacts 50c and line 66 to slidewire 40, and through the contacts 50e to ground. There is thus provided across slidewire 40 a potential representative of the output at line 64a from the computer 60.

In accordance with the position of contact 40a on slidewire 40, a fraction of that potential appears on line 68 and is connected through the contacts 50b to an input line 70 of the isolating servoamplifier 76.

Similar connections will be completed from each of the slidewire contacts 40b–40d to other servoamplifiers, each corresponding with amplifier 76. Since the adjustments of contacts 40a–40d are made concurrently and by equal amounts, they produce outputs for equal–λ operation of the several stations.

The signal representing the value of λ, represented by that fraction of the output signal determined by the position of contact 40a, multiplied by a signal representing the quantity representative of unity minus the incremental transmission loss for station $P_1$ develops an output signal representative of the product $dF_1/dP_1$ which is applied to the servoamplifier 76. In response to the signal representative of the product, the balancing motor 84 is operated in a direction to adjust contact 75a to reduce the difference between the inputs on lines 70 and 80 to zero, and the tachometer 86 by way of line 88 provides the necessary stabilizing feedback for this balancing action.

The balancing motor 84 is connected by way of mechanical coupling 90 to slidewire contact 92a of a potentiometer slidewire 92. The slidewire 92, being essentially a retransmitting slidewire, produces at the contact 92a a potential corresponding with that at contact 75a and this potential represents the quantity $dF_1/dP_1$, the incremental cost of generation for station $P_1$.

The incremental station cost signal from contact 92a provides an input by way of line 94 to an operational amplifier 96. It will be noted that the feedback resistance for the operational amplifier 96 includes a fixed resistor 96f and a variable resistor 98, the value of which is established by the positioning of its contact 98a. The latter contact is manually set to a position indicative of the cost of the fuel being utilized to station $P_1$. By positioning the contact 98a on feedback resistor 98 in accordance with the fuel cost for station $P_1$, there is developed at the output of amplifier 96 an output signal varying with and proportional to the desired incremental heat rate for that station for most economical operation of the system. Since the station includes two generators, the output from amplifier 96 is applied respectively to sidewires 112 and 114. From each of sidewires 112 and 114 there will be derived, as by way of their respective movable contacts 112a and 114a, fractional parts of the signals developed across said slidewires for application to the function generators 110 and 113. The contacts 112a and 114a are manually set to positions for modification of the output voltage from amplifier 96 to take into account the relative efficiencies of the two generators, thereby more accurately to reproduce in the form of an output signal the incremental heat rate characteristics of said generators.

The function generators 110 and 113 may desirably be of the type shown in U.S. Patent 3,059,853 issued to Frederick B. Davis III, on October 23, 1962.

The outputs of the function generators 110 and 113 are signals representing the desired generation values $P_{1d1}$ and $P_{1d2}$ for the units $G_1$ and $G_2$. These values are summed by means of an operational amplifier 120 to provide an output signal $P_{1d}$ representative of the total desired generation for station $P_1$. As previously described, the output of the operational amplifier 120 is applied to line 20. It is also applied by way of line 124 to computer 60 as one of the inputs $P_{1d}$ therefor. The remaining inputs for the computer 60 have been illustrated for the remaining three stations and identified as $P_{2d}$, $P_{3d}$ and $P_{4d}$.

In order to utilize the computed desired generation value $P_{1d1}$ for the control of the output of the generator unit 1, the signal $P_{1d1}$ is utilized for control of the governor motor 132 for generator $G_1$. For example, as shown in FIG. 1, governor 130 for generator $G_1$ is adjusted by the governor motor 132 in accordance with the output of the operational amplifier 138. This output has a value $P_{1r1}$ representing the difference between the desired generation value $P_{1d1}$ as appearing on input line 140 and the actual generation value $P_{1a1}$ which appears on input line 142. As shown in FIG. 1, the actual generation value $P_{1a1}$ is obtained from the power measuring instrument $W_1$ and is applied to both lines 21 and line 152. The other unit in the station is controlled in a similar manner, and its actual generation value $P_{1a2}$ is represented by a signal, the source of which is not shown, applied to line 22 as an input to amplifier 18.

From the above description of the operation of FIG. 1 with transverse switch 50 in its "Econ" position, it will be evident that when the area requirement as represented by the signal on contact 12a has been reduced to zero, then the distribution of the load to the four stations of the system will be such as to provide equal-λ operation as represented by the equal positions of the slidewire contacts 40a–40d. The area requirement signal decreases as the generation changes take place, more particularly as the values of actual generation approach and are made equal to the completed values of desired generation.

In accordance with the present invention, there is provided not only needed flexibility to take care of conditions beyond the normal range of changes readily handled by the system thus far described, but also to eliminate the need of, or at least to minimize, transfer of generation from one area to an adjacent area by way of a tieline. More particularly, it has been found, as previously mentioned, that there are, during certain times of the year, peak load periods in most power systems, which peak load periods require that there be supplied, compatible with the installed capacity of the system and its particular requirement for spinning reserve, the maximum amount of power to the customer load. Such a mode of operation minimizes the purchase of power from any neighboring system or area with which the particular area may be interconnected. During such peak periods, it will be desirable, for such a mode of operation, to operate so as to maintain the total transmission losses at a minimum, thereby to achieve what is referred to as minimum input dispatch. If the total transmission losses be maintained at a minimum, it follows that the given load condition will be met with a minimum total generation applied to the transmission lines. In order to achieve minimum input dispatch, it is necessary to control the generation to achieve equality of the incremental transmission losses for each of the stations. Operation of the system of FIG. 1 can be changed from "economic dispatch" (above described) to "minimum input dispatch" (now described) by effecting significant changes in the circuitry used. Specifically, with the transverse switch 50 thrown to its minimum input dispatch position, indicated as "MID" in FIG. 1, the circuit relations established achieve the stated objective of minimum input dispatch in the following manner. The positions of slidewire contacts 40a–40d, instead of representing equal values of λ for the several stations, are now representative of the quantity one minus the incremental transmission loss $$\left(1-\frac{\partial P_\mathrm{L}}{\partial P_\mathrm{m}}\right)$$

"As will be seen from FIG. 1, with the switch 50 in the "MID" position, the switch elements 50f, 50g, 50d and 50h are closed. Thus, the contacts 50d and 50h connect the source 200 across the slidewire 40 in order to establish a potential on contact 40a representative of the quantity $$\left(1-\frac{\partial P_\mathrm{L}}{\partial P_1}\right)$$

to be established, it being remembered that there will at the same time be developed from the remaining slidewires 40 the quantities $$\left(1-\frac{\partial P_\mathrm{L}}{\partial P_2}\right), \left(1-\frac{\partial P_\mathrm{L}}{\partial P_3}\right)$$

and $$\left(1-\frac{\partial P_\mathrm{L}}{\partial P_4}\right)$$

It is to be noted further that as long as there is an input to the servoamplifier 30, the motor 31 will be energized to change the positions of the contacts 40a–40d to change by equal amounts the magnitudes of the aforesaid quantities respectively corresponding with the incremental transmission losses associated with the power generations of the several sources individually.

It will now be shown that as these quantities are changed, so are the inputs to the computer 60, and so will be the output $P_{1d}$ from the amplifier 120 representative of the desired generation for station $P_1$. When the output of amplifier 120 represents that value of generation for station $P_1$ realized by the adjustment of the generating units of that station (and the same for the remaining three stations), the inputs to the computer 60 will have changed, the error signal at input 42 to amplifier 30 will have been reduced to zero, and there will be balance or equality as between the quantity derived from the several contacts corresponding with 40a–40d and the outputs from the computer. The manner in which the foregoing is accomplished will now be set forth in terms of the operation for station $P_1$.

By reason of the closure of contacts 50g, the output of computer 60 at line 64a is applied directly to the input line 70 of servoamplifier 76. Applied to the other input 80 of servoamplifier 76 by way of now-closed contacts 50f and conductor 68 is the signal developed from the contact 40a of slidewire 40. The difference between these two inputs produces an output from the servoamplifier 76 for energization of the motor 84, the tachometer 86 again providing the stabilizing negative feedback signal, and the balancing motor operates to adjust contact 92a of the potentiometer slidewire 92. It is to be noted that for minimum input dispatch operation, the effective output signal of slidewire 92 is the incremental cost of generation of station P1 for equal incremental transmission losses of the station rather than for equal incremental costs of delivered power. It is also to be noted that, for minimum input dispatch operation, the potentiometer slidewire 75 is disconnected from the amplifier 76 by the opening of contacts 50a.

Since, with the same change in area requirement, a signal representative of λ changes in magnitude in a direction opposite to a signal representative of the quantity unity minus the incremental transmission losses, it is necessary, for minimum input dispatch operation by the system of FIG. 1, to transfer the ground connection from the lower side of slidewire 40 to the opposite or upper side thereof. This is accomplished, when switch 50 is thrown to its "Mid" position, by the opening of contacts 50e and the closure of contacts 50d.

Any change in position of the slidewire contact 92a changes the input to amplifier 96 and likewise produces a change in the output of amplifier 120. This action continues until the several inputs to the computer 60 produce at the output line 64a and output signal equal to that developed from slidewire potentiometer 40 and applied by way of its contact 40a to the amplifier 76. When this is accomplished for each of the stations, the computed generations for stations $P_1$–$P_4$ will be those required for equal values of unity minus the transmission loss for each station. When area requirement has been balanced by the sum of the computed required station generations $P_{1r}$–$P_{4r}$, then the control system will have stabilized and the inputs to amplifiers 30 and 76 will both be reduced to zero. More specifically, the control network thus far described reduces to zero the error signal at conductor 42, as well as reducing to zero the difference between the two inputs to amplifier 76, notwithstanding that the generation changes called for have not yet been accomplished at station $P_1$ or at the remaining stations $P_2$, $P_3$ and $P_4$. In this connection, it will be observed, however, that the governor motor 132 will be energized until the operation of the governor 130 has, by reason of its control of the driving unit or turbine T for generator $G_1$, produced a change in the actual generation $P_{1a1}$ equal to the computed desired generation $P_{1d1}$, shown appearing on line 140 as one of the inputs to the amplifier 138.

In summary, the position of slidewire contact 40a is, as has been previously described, constantly changed until the sum of the computed station requirement values $P_{1r}$, $P_{2r}$, $P_{3r}$ and $P_{4r}$, as established at the input of operational amplifier 16, balances the other input to that amplifier, namely the area requirement signal from contact 12a. Thus, as long as the computed requirements for the generation of the several stations do not equal the desired total requirements for the system as established by the area requirement computer 10, there is a constant change in the position of contact 40a and a resulting change in the position of contact 92a until the computed values $P_{1d}$–$P_{4d}$ are effective to change the requirement signals $P_{1r}$–$P_{4r}$ to values which will balance out the signal representing area requirement.

The computing arrangement of FIG. 1 by the utilization of the feedback signals representing station requirements, namely $P_{1r}$, $P_{2r}$, $P_{3r}$ and $P_{4r}$, is operable to calculate the final desired generation values, such as $P_{1d}$, regardless of the rates of response of the various generators in the system for ultimate reduction of the area requirement to zero. Where such precalculation of final desired generation values is not necessary, other arrangements may be utilized in accordance with this invention to effect minimum input dispatch operation. For example, with switch 50 in its Mid position and by merely opening switch $S_w$, the computing arrangement operates to achieve minimum total transmission losses, when the area requirement has been reduced to zero, by utilizing for its feedback the actual generation in the power system. This is accomplished since the only input to amplifier 16 will now be the signal representative of area requirement as developed from the potentiometer 12. Thus, as the area requirement signal diminishes and eventually comes to zero due to the change in generation of the several stations to meet the computed generation requirements, the system will be in balance. This floating type of control will in some instances be advantageous. In such an application, the signals appearing at line 94 may be telemetered to station $P_1$ (and corresponding signals telemetered to remaining stations), the remainder of the circuit components shown connected to line 94 and to amplifier 96 then being located at station level.

With the above understanding of two embodiments of the invention, it will be understood that many changes may be made within the scope of the appended claims and that certain features may be utilized without other features. For example, the control system may include only the provisions necessary for minimum input dispatch rather than provisions both for minimum input dispatch and for economic dispatch. Besides substituting a digital computer for the matrix, additional quantities may be converted to the binary system and utilized in the computer, as for example, area requirement with conventional analog-to-binary converters utilized, and including one connected to the outputs of the power measuring devices including wattmeter $W_1$. While computers of either digital or the matrix type utilizing the B-constants described in said Early Patent 2,836,730 may be preferred, it is to be understood that other expressions can and do define incremental transmission losses. As explained by Early in his said patent, columns 51 and 52 when all sources are operating at the same phase angle, the incremental transmission losses of all stations will be equal. Accordingly, the present invention includes the utilization of the phase-angle computations in place of the B-constant approach to obtain minimum input dispatch operation. The present invention also includes the utilization of linear and dynamic programming computations to obtain minimum input dispatch operation.

Further in accordance with the invention and as exemplary of a system providing only minimum dispatch operation, there has been shown diagrammatically in FIG. 2 a further analog arrangement which may likewise have its counterpart in a digital computer and including at least the converter 360 of FIG. 2. In FIG. 2, there is again provided a system 310 for producing an output representative of area requirement, which output is applied to an operational amplifier 316. The additional inputs to amplifier 316 correspond with computed station requirement values $P_{1r}$, $P_{2r}$, these two stations $P_1$ and $P_2$ comprising the area under consideration.

Any difference between the area requirement value and the sum of the station requirement values causes the DIAT controller 311 to change the position of the contact on slidewire 340 so that it will produce on the bus line 341 a potential representative of the equal incremental transmission loss value which is desired. The DIAT controller 311 may correspond with the one disclosed in Jenkins et al. Patent 3,008,072 where the mechanical output from that controller is applied directly to the contact 340a of a potentiometer slidewire 340.

The line 341 provides inputs to the incremental transmission loss computer 360 which may in this case be of a type different from that shown in FIG. 1. It may be of the type shown in U.S. Patent No. 2,836,731 issued to W. G. Miller, Jr. on May 27, 1958, more particularly, the computer 207 of FIG. 1 of that patent with the omission of transformers 72, 81 and 82. The outputs produced by this type of transmission loss computer are potentials representative of the desired generation for the individual stations, namely $P_{1d}$ and $P_{2d}$. These values are compared with the actual generation values, as shown for station $P_1$, by means of operational amplifier 418. There is thereby produced a potential representative of the requirement $P_{1r}$ for station $P_1$. This output potential is operative to change the governor motor adjustment until the actual value of generation $P_{1a}$ is equal to the value calculated for $P_{1d}$. As shown in FIG. 2, the values $P_{1r}$ and $P_{2r}$ are fed back to provide the inputs to the operational amplifier 316, thus completing the feedback loop for the computing operation described.

It will be obvious to those skilled in the art that various other modifications of the computing and control arrangements shown in FIGS. 1 and 2 can be utilized to accomplish the same objective, namely, a "minimum input" dispatch operation. It will also be evident that the quantity which is maintained in equality for each of the several stations may not only be the quantity representing the incremental transmission losses associated with those individual stations, as in FIG. 2, but may be the quantity representing unity minus the incremental transmission loss as shown in FIG. 1

$$\left(1 - \frac{\partial P_L}{\partial P_m}\right)$$

or alternatively could be the quality 1 over unity minus the incremental transmission loss $$\left(\frac{1}{1 - \frac{\partial P_L}{\partial P_m}}\right)$$

or in fact any other quantity including the incremental transmission loss as one of its terms where equality between the quantities also results in equality between the incremental transmission losses.

What is claimed is:

1. A minimum input dispatch system for determining the desired generation for each of a group of sources to equal a required total generation, said sources being interconnected by transmission lines, said system comprising
    means for producing for each level of total generation required of the group of sources an input signal representative of equal incremental transmission losses respectively associated with the individual sources,
    means for producing for each level of said input signal a corresponding set of output signals representative of the generations respectively required from said sources to obtain equality of their incremental transmission losses at a given level of total group generation, and
    means for changing said input signal in direction and to extent to cause the sum of said generations as represented by said output signals to equal the total generation required from said group of sources.

2. A control system for controlling the individual contribution of interconnected generating stations of a power system, comprising
    first means responsive to the difference between a desired condition of said system and an actual condition of said system for producing a control signal indicative of equal incremental transmission losses for each of said stations, and
    second means for varying the generation of at least one of said stations in response to said control signal to tend to bring said actual system condition to said desired system condition while maintaining equality between the respective incremental transmission losses of said stations as represented by said control signal.

3. The system of claim 2 in which said first means includes a computer and which for conversion to a control system operating in either of two possible modes additionally includes switching elements associated with the computer circuitry to produce for the first of said modes of operation a control signal indicative of equal incremental transmission losses and to produce for the second of said modes of operation a control signal indicative of equal incremental cost of delivered power for each of said stations.

4. The system of claim 3 in which there is associated with said switching elements an input device for each of said stations, said device, when effectively switched for operation of the control system in the first mode, to compute a control signal indicative of equal transmission losses and of increasing magnitude for an increasing difference between desired and actual condition of the power system; when switched for operation of the control system in the second mode, to compute a control signal indicative of equal incremental cost of delivered power and of increasing magnitude in opposite sense for the same difference of power-system condition.

5. A system for controlling the individual contribution of a group of sources interconnected by transmission lines to form a power distribution system, comprising
    means for changing an input signal representative of equal incremental transmission losses associated with said sources in response to the deviation of a system condition from a predetermined value,
    means for producing in response to said changed input signal a plurality of output signals respective representative of the generation required for each of said sources to produce operation at said equal incremental transmission losses, and
    a plurality of means respectively operable to change the individual generations of said sources toward the total generation required for correction of said deviation and to maintain equality of the incremental transmission losses associated with said individual sources.

6. A system for controlling the individual contribution of a group of sources interconnected by transmission lines to form a power distribution system, comprising
    means for producing an input signal representative of equal incremental transmission losses associated with said sources at different levels of total generation of said group of sources,
    means for producing in response to different levels of said input signal a corresponding set of output signals respectively representative of calculated levels of generation required for each of said sources to produce operation at said equal incremental transmission losses,
    means operable to change said input signal in direction and to extent to cause the sum of said calculated levels of said generations as represented by said output signals to equal the required total generation of said group to maintain a predetermined condition of said power distribution system, and
    means operable to change the existing levels of individual generations of said sources in the direction of said calculated levels to establish said predetermined system condition with a minimum loss in said transmission lines.

7. A control system for controlling the individual contribution of generating sources interconnected by transmission lines in a power distribution network, comprising
    means for establishing an input signal,
    means responsive to the difference between a desired condition of said distribution network and an actual condition of said network for producing a change in said input signal, said input signal change being indicative of a requirement for change in the generation of said sources required to meet a predetermined network condition,
    means responsive to said changed input signal for computing the changes in generation respectively required at said individual sources for establishing said predetermined network condition while minimizing the losses in said transmission lines, and
    means for varying the generation of individual sources each in accordance with said computed change in its generation.

8. For a power distribution system having individual generating sources interconnected by transmission lines, a mode of determining the generation levels of the individual sources for which their associated incremental transmission losses are equal at each of different levels of total generation of the group comprising the steps of
  producing first signal levels which correspond with levels of equal incremental transmission losses for each of said individual sources at different levels of total generation of said sources as a group,
  producing for each level of said first signal a corresponding set of second signals whose levels respectively correspond with generation levels of each of the individual sources for which their incremental transmission losses are equal; and
  producing changes in said first signal level with changes in total generation requirements of said sources and maintaining the sum of said second signals equal to a level corresponding with the actual total generation of said group of sources.

References Cited

UNITED STATES PATENTS

| | | | |
|---|---|---|---|
| 2,866,102 | 12/1958 | Cohn | 307—57 |
| 2,871,375 | 1/1959 | Early | 235—151.21 X |
| 2,889,466 | 6/1959 | Brownlee | 235—151.21 X |
| 3,049,298 | 8/1962 | Barber et al. | 235—193 X |
| 3,117,221 | 1/1964 | Kirchmayer | 235—151.21 X |
| 3,229,110 | 1/1966 | Kleinbach et al. | 307—57 |

MALCOLM A. MORRISON, *Primary Examiner.*

I. KESCHNER, F. D. GRUBER, *Assistant Examiners.*

UNITED STATES PATENT OFFICE
CERTIFICATE OF CORRECTION

Patent No. 3,392,272                              July 9, 1968

Walter O. Stadlin

It is certified that error appears in the above identified patent and that said Letters Patent are hereby corrected as shown below:

Column 4, line 29, "rotation" should read -- station --; line 54, "the", first occurrence, should read -- that --; line 73 "to" should read -- in --. Column 5, line 18, "III" should read -- 3rd --; line 43, "152" should read -- 142 --; line 58, "completed" should read -- computed --. Column 9, line 18, "quality" should read -- quantity --. Column 10, line 20, "respective" should read -- respectively --.

Signed and sealed this 10th day of February 1970.

(SEAL)

Attest:

Edward M. Fletcher, Jr.                        WILLIAM E. SCHUYLER, JR.

Attesting Officer                                 Commissioner of Patents